July 9, 1940.  A. S. T. LAGAARD  2,207,590
DOUGHNUT MACHINE
Filed Oct. 5, 1936
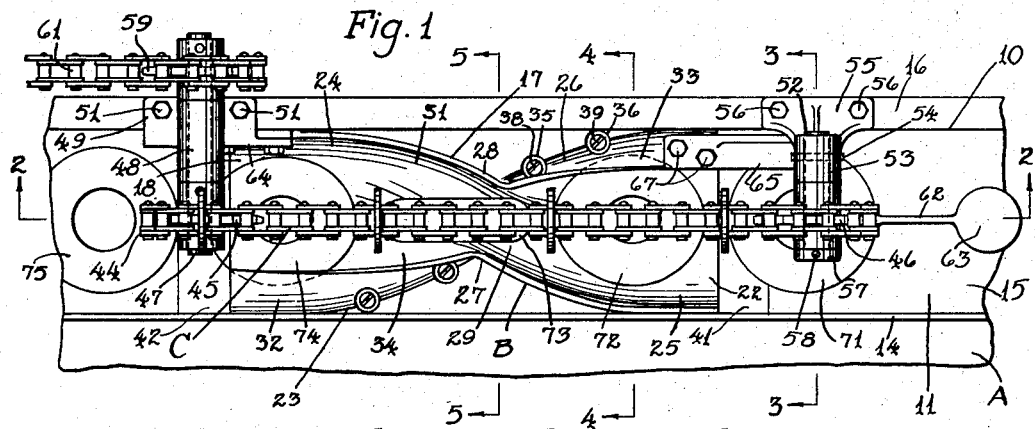
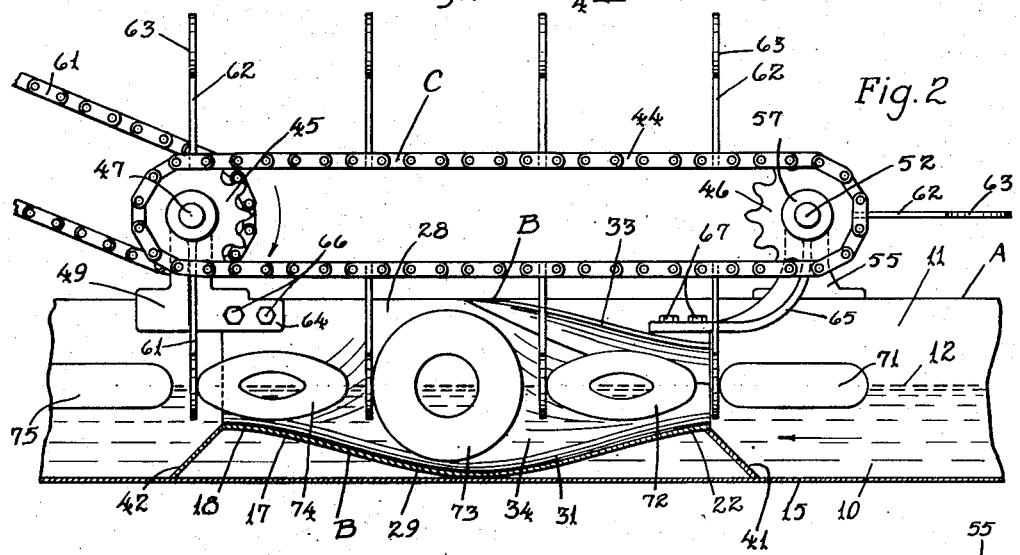
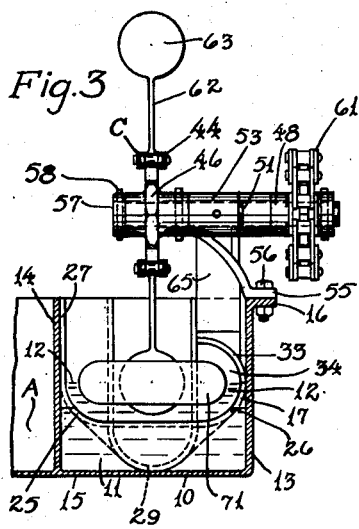
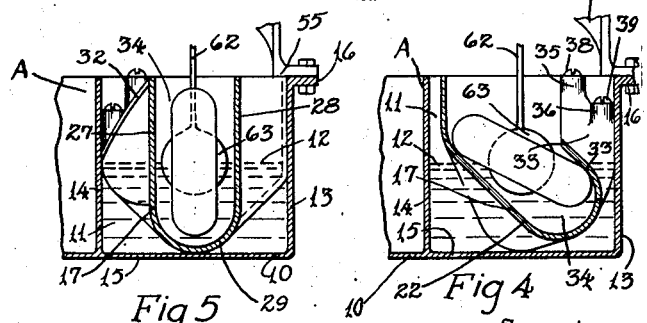
Inventor
Alexander S. T. Lagaard
By Caswell & Lagaard
Attorneys Patented July 9, 1940

2,207,590

UNITED STATES PATENT OFFICE 2,207,590

DOUGHNUT MACHINE

Alexander S. T. Lagaard, Minneapolis, Minn.

Application October 5, 1936, Serial No. 104,092

16 Claims. (Cl. 53—7)

In certain types of doughnut machines the doughnuts are deposited in a cooking liquid contained in an elongated pan or receptacle providing a way along which the doughnuts may travel, and are progressed along the way through propulsion of the cooking medium by means of a propeller or other flow impelling device. When the doughnuts reach a position somewhere near the middle of the way the doughnuts are turned over and when they reach the end of the way they are removed therefrom. The present invention relates to the turner and to a control device therefor.

An object of the invention resides in providing a turner which will be readily accessible for cleaning.

A still further object of the invention resides in providing a turner in which eddy currents are prevented and in which a minimum amount of resistance is afforded to the flow of the cooking liquid.

Another object of the invention resides in providing a turner in which maximum propelling force of the liquid for propelling the doughnuts through the turner is procured.

An object of the invention resides in providing a control device by which the rate of travel of the doughnuts through the turner is positively controlled.

Another object of the invention resides in providing a control device by means of which the number of doughnuts traveling through the turner in a given length of time is positively controlled.

Other objects of the invention reside in the novel combination and arrangement of parts and in the details of construction hereinafter illustrated and/or described.

In the drawing:

Fig. 1 is a plan view of a portion of a doughnut machine illustrating an embodiment of my invention.

Fig. 2 is an elevational sectional view taken on line 2—2 of Fig. 1.

Fig. 3 is a cross sectional view taken on line 3—3 of Fig. 1.

Fig. 4 is a cross sectional view taken on line 4—4 of Fig. 1.

Fig. 5 is a cross sectional view taken on line 5—5 of Fig. 1.

Inasmuch as the construction of doughnut machines with which my invention may be used is well known in the art, a complete doughnut machine has not been illustrated in this application and only so much of the doughnut machine as is necessary to describe the present invention has been shown.

In the drawing a portion of a doughnut machine A has been shown which consists of a pan 10 having a way 11 in the same. This pan contains the cooking liquid which is indicated by the reference numeral 12. The cooking liquid travels as previously described in the direction of the arrow as shown in Fig. 2 and causes the progression of doughnuts along the way, the doughnuts floating along the surface of the cooking liquid. The pan 10 is constructed with side walls 13 and 14 and a bottom 15 connected therewith. Issuing outwardly from the side wall 13 is a flange 16 which serves to support the pan and which incidentally supports the invention.

The invention proper comprises a turner indicated in its entirety by the reference numeral B and a control device C therefor. The turner B consists of a flattened twisted conduit 17 which is constructed in the following manner: Conduit 17 is constructed with a lowermost portion which serves as a trough and which is designated in its entirety by the reference numeral 31. This conduit further includes two closure or guide members 32 and 33 which form a part of the conduit and which are detachably secured to the trough. Trough 31 is formed at one end with a bottom 18, and at its other end with another bottom 22. Adjacent the bottom 18 are provided curved portions 23 and 24 which are connected to the bottom 18. Adjacent the bottom 22 are similarly constructed curved portions 25 and 26 which are connected to the bottom 22. At the center of the trough 31 the same is constructed with vertical walls 27 and 28 which are spaced from one another and throughout a short portion of the length of the conduit are parallel. These walls have a curved bottom 29 connected to the same. The bottom 18 is twisted between the forward end thereof and the center of the conduit so that the said bottom lies in continuation of the wall 18. In a similar manner the bottom 22 is twisted so that at the center of the device said wall lies in continuation of the wall 27. The curved portions 23 and 24 and the curved portions 25 and 26 merge into the curved bottom 29. The walls 27 and 28 issue upwardly from the curved portions 24 and 25 and extend to the top of the pan 10. It will thus be seen that the trough is provided with surfaces which conform in shape to the shape of the walls of the conduit and which provide a twisted channel 34 extending through the same.

Attached to the curved portion 26 of the trough 31 is the closure 33 previously referred to. This closure is made separate from the trough so as to facilitate casting of the trough without the use of cores. Closure 33 is curved as shown in Fig. 3 so that the same has a surface lying in continuation of the surface of the curved portion 26 of trough 31 and which serves as a guide for maintaining the doughnuts in proper position while traveling through the way 34. This closure is constructed with bosses 35 and 36 through which bolts 38 and 39 extend which are screwed into similar bosses in the trough 31, not illustrated. By means of these bolts the closures 33 are securely held attached to the trough proper. The closure 32 is constructed in the same manner and is similarly held attached to the trough 31.

At the beginning and end of the conduit 17 are provided two ramps 41 and 42 which direct the cooking liquid from the bottom 15 of the way 11 and into the channel 34 in the turner B and out of said channel and back into said way. It will be noted that the channel 34c is open at the top throughout the central portion of the same. This is for the purpose of giving access to the interior of the channel so as to permit of readily cleaning the same.

Operating in conjunction with the conduit 17 is the control device C which functions as a member for affecting the flow-imparted movement of the doughnuts and controls the rate of entry of doughnuts into the turner B and which also controls the rate of travel of the doughnuts through the turner. This control device consists of a chain 44 which passes over two sprocket wheels 45 and 46. The sprocket wheel 45 is mounted upon a shaft 47 which is journaled in a bearing 48. Bearing 48 is integral with a bracket 49 which is attached to the flange 16 of pan 10 by means of two bolts 51. The sprocket wheel 46 is rotatably mounted upon a shaft 52 which is secured in a boss 53 by means of a pin 54. The boss 53 is formed on a bracket 55 which is attached to the flange 16 by means of bolts 56. The sprocket wheel 46 is held from longitudinal movement on the shaft 52 by means of a collar 57 which is secured to the end of said shaft by means of a set screw 58. The shaft 47 is driven by means of another sprocket wheel 59 fast on shaft 47. A chain 61 passes over said sprocket wheel and may be driven from a suitable source of power as for example an independent motor driven at the proper rate of speed. The chain 61 instead may be driven from some rotating shaft or part of the doughnut machine which travels at the proper speed. The particular manner of driving the control device C not forming any feature of the invention has not been shown in the drawing. The chain 44 has secured to it at intervals a number of arms 62 which project outwardly therefrom and which are spaced apart a distance slightly greater than the largest dimension of a doughnut. These arms have blades 63 attached to the ends of the same. The arms 62 may be welded to the blade 63 and likewise welded to the links of the chain. The arms 62 are of such a length that the blades 63 when extending into the pan 10 come opposite the centers of the doughnut when floating in the cooking liquid. These blades control the rate of travel of the doughnuts through the channel 34 in the conduit 17.

The conduit 17 is supported in the way 11 by means of supports 64 and 65 which issue outwardly from the brackets 49 and 55. The support 64 is bolted to the wall 28 of trough 31 by means of bolts 66 and the support 65 is bolted to the closure member 33 of the trough by means of bolts 67. In this manner the conduit 17 is firmly supported within the tray 11 and in fixed relation to the control device C.

The conduit 17 is symmetrical and the sections shown in Figs. 3 and 4 correspond with similar sections taken at the other end of the machine.

The operation of the invention is as follows: The cooking liquid is caused to circulate through the machine at any desired speed. If the velocity of the cooking liquid is less than that required to positively force the doughnuts through the conduit 17 but sufficient to deliver them to the turner blades 63 serve to positively force the doughnuts through the turner. If the velocity of the cooking liquid is greater than that required to force the doughnuts through the conduit 17, the blades 63 serve to retard the movement of the doughnuts through the turner. In Figs. 2, 3, 4 and 5 the doughnuts have been shown in various positions and separate doughnuts are shown at different localities in the turner. The doughnut 71 is shown as just about to enter the turner and has engaged one of the blades 63 which holds the same from entering. This doughnut is illustrated in Fig. 3. The doughnut 72 is disposed partly within the conduit 17 and has been engaged by the twisted portion of the bottom 22 of trough 31 and has been slightly elevated, occupying the position shown in Fig. 4. The doughnut 73 is in the center of the turner and has been turned so that it occupies a position at right angles to its original position. This doughnut is in between the two parallel portions of the walls 27 and 28. The doughnut 74 has been turned beyond the position shown in Fig. 3 and rests upon the twisted portion of the bottom 18 of the trough 31 and also against the closure 32. The closure 33 as will be observed forms a guide for assisting in turning the doughnuts and the closure 32 similarly acts in directing the doughnuts back to normal position. The doughnut 75 has been shown as leaving the machine and occupies a position similar to that of doughnut 71 shown in Fig. 3. It will become evident that as the chain 44 travels the blades 63 are successively inserted into the cooking liquid to separate the doughnuts therein and as the blades reach the end of the conduit 17, said blades are raised out of the cooking liquid and the doughnuts entrapped between the same are freed. In this manner the number of doughnuts passing through the conduit 17 in a given length of time is accurately controlled without the necessity of conveying means throughout the entire length of the way 11 and at the same time the rate of travel of the doughnuts along the turner is controlled.

The advantages of my invention are manifest. An extremely simple and practical turner is provided for doughnut machines of the class described. The control device causes positive operation of the turner and whether the rate of flow of the cooking liquid is greater or less than that necessary to cause the doughnuts to travel through the twisted channel in the turner conduit. By constructing the conduit open along the uppermost portion of the same access to the channel within the conduit may be had for the purpose of cleaning and inspection and at the same time a passageway is provided along which the control mechanism may travel. In my invention the number of doughnuts passing through the machine is accurately controlled as well as the rate of travel of the doughnuts through the turner.

Changes in the specific form of my invention, as herein disclosed, may be made within the scope of what is claimed without departing from the spirit of my invention.

Having described my invention, what I claim as new and desire to protect by Letters Patent is:

1. A turner for doughnut machines in which the doughnuts are progressed along a way through the flow of the cooking liquid, said turner comprising a flattened twisted duct, disposed in said way and through which the cooking liquid travels, said duct being rounded at the lowermost portion thereof.

2. A turner for doughnut machines in which the doughnuts are progressed along a way through the flow of the cooking liquid, said turner comprising a flattened twisted duct, disposed in said way and through which the cooking liquid travels, the lowermost portion of said duct at the vicinity of the center of the duct being rounded.

3. A turner for doughnut machines in which the doughnuts are progressed along a way through the flow of the cooking liquid, said turner comprising a trough formed with a twisted channel and disposed in said way and through which the cooking liquid travels, said trough at a certain locality having a rounded bottom.

4. A turner for doughnut machines in which the doughnuts are progressed along a way through the flow of the cooking liquid, said turner comprising a trough formed with a twisted channel and disposed in said way and through which the cooking liquid travels, said channel at its ends having a bottom surface and lateral surfaces connected through rounded fillets therewith, said channel intermediate its ends having spaced vertical surfaces, and a rounded valley connected therewith, said bottom surfaces merging into said vertical surfaces and said valley merging into said fillets.

5. A turner for doughnut machines in which the doughnuts are progressed along a way through the flow of the cooking liquid, said turner comprising a trough formed with a twisted channel and disposed in said way and through which the cooking liquid travels, said trough being open at the upper portion of the same to give access to said channel from above.

6. In a doughnut machine in which the doughnuts are progressed along a way through the flow of the cooking liquid, a turner comprising a trough formed with a twisted channel and disposed in said way and through which the cooking liquid travels, said trough being open at the upper portion of the same to give access to said channel from above, and means extending into said channel from above and controlling the rate of travel of the doughnuts passing through said channel.

7. In a doughnut machine in which the doughnuts are progressed along a way through the flow of the cooking liquid, a turner comprising a trough formed with a twisted channel and disposed in said way and through which the cooking liquid travels, said trough being open at the upper portion of the same to give access to said channel from above, and means extending into said channel from above and controlling the rate of entry of doughnuts into said channel.

8. In a doughnut machine in which the doughnuts are progressed along a way through the flow of the cooking liquid, a turner comprising a duct having a twisted channel therethrough and disposed in said way and through which the cooking liquid travels, and a movable member for engagement with the doughnuts, said member controlling the rate of entry of doughnuts into said channel.

9. In a doughnut machine in which the doughnuts are progressed along a way through the flow of the cooking liquid, a turner comprising a duct having a twisted channel therethrough and disposed in said way and through which the cooking liquid travels, a movable member for engagement with the doughnuts and having vertical movement, and time controlled means for moving said member into and from said way, to first engage and then clear a doughnut traveling along said way.

10. In a doughnut machine in which the doughnuts are progressed along a way through the flow of the cooking liquid, a turner comprising a duct having a twisted channel therethrough and disposed in said way and through which the cooking liquid travels, and a movable member for engagement with the doughnuts, said member moving along said channel and retarding the rate of travel of the doughnuts through said channel.

11. In a doughnut machine in which the doughnuts are progressed along a way through the flow of the cooking liquid, a turner comprising a duct having a twisted channel therethrough open at the top and disposed in said way and through which the cooking liquid travels, and a movable member extending into said channel from above and movable along the same for controlling the rate of travel of doughnuts through the channel.

12. In a doughnut machine in which the doughnuts are progressed along a way through the flow of the cooking liquid, a turner comprising a duct having a twisted channel therethrough open at the top and disposed in said way and through which the cooking liquid travels, a conveyor disposed above said duct and having flights extending into said channel from above and engaging the doughnuts and controlling the rate of travel of the same through the channel.

13. A turner for doughnut machines in which the doughnuts are progressed along a way through the flow of the cooking liquid, said turner comprising a trough formed with a twisted channel and disposed in said way and through which the cooking liquid travels, and guide members at opposite ends of the trough and on opposite sides of the trough, said guide members forming a continuation of the channel above the trough.

14. In a doughnut machine in which the doughnuts are progressed along a way through the flow of cooking liquid, a turner, a vertically movable member for engagement with the doughnuts as they enter said turner, and time controlled means for moving said member into and from said way to first engage and then clear the doughnuts.

15. In a doughnut machine in which the doughnuts are progressed along a way through the flow of the cooking liquid, a turner in said way through which the doughnuts travel, a movable member disposed in the way and adapted to control the rate of entry of doughnuts into the turner, means for guiding said member for up and down movement, said member being movable from a position engageable with the doughnuts to a position free from the doughnuts, and time controlled means for moving said movable member alternately from one position to the other.

16. In a doughnut machine in which the doughnuts to be cooked are progressed along a way through the flow of the cooking liquid, a turner in said way for inverting the progressing doughnuts, a member for affecting the flow-imparted movement of the doughnuts to control the advancement of a doughnut in relation to its inversion by said turner, and means for moving said member from a position engaging a doughnut in the path of travel thereof to a position free from said doughnut.

ALEXANDER S. T. LAGAARD.